United States Patent
Sundholm

(10) Patent No.: US 7,040,259 B2
(45) Date of Patent: May 9, 2006

(54) SPRAYING HEAD

(75) Inventor: Göran Sundholm, Tuusula (FI)

(73) Assignee: Marioff Corporation OY, Vantaa (FI)

( * ) Notice: Subject to any disclaimer, the term of this patent is extended or adjusted under 35 U.S.C. 154(b) by 0 days.

(21) Appl. No.: 10/511,942

(22) PCT Filed: Apr. 16, 2003

(86) PCT No.: PCT/FI03/00305

§ 371 (c)(1),
(2), (4) Date: Mar. 28, 2005

(87) PCT Pub. No.: WO03/089779

PCT Pub. Date: Oct. 30, 2003

(65) Prior Publication Data

US 2005/0161008 A1  Jul. 28, 2005

(30) Foreign Application Priority Data

Apr. 19, 2002  (FI) .................................. 20020753

(51) Int. Cl.
*F02M 25/28* (2006.01)
(52) U.S. Cl. .................................................. 123/25 A
(58) Field of Classification Search ............. 123/25 A, 123/25 J, 25 R, 540
See application file for complete search history.

(56) References Cited

U.S. PATENT DOCUMENTS

| 4,333,423 A | | 6/1982 | Firey | |
|---|---|---|---|---|
| 4,461,245 A | * | 7/1984 | Vinokur | 123/25 L |
| 4,958,598 A | * | 9/1990 | Fosseen | 123/1 A |
| 5,148,776 A | * | 9/1992 | Connor | 123/25 J |
| 6,016,832 A | * | 1/2000 | Vars et al. | 137/487.5 |
| 6,273,032 B1 | * | 8/2001 | Ruoff et al. | 123/25 R |
| 6,299,075 B1 | | 10/2001 | Koller | |
| 6,892,680 B1 | * | 5/2005 | Lee | 123/25 A |
| 2003/0140873 A1 | * | 7/2003 | Lee | 123/25 A |
| 2005/0172916 A1 | * | 8/2005 | Sundholm | 123/25 G |

FOREIGN PATENT DOCUMENTS

GB  2241180 A  8/1991

* cited by examiner

*Primary Examiner*—Henry C. Yuen
*Assistant Examiner*—Jason Benton
(74) *Attorney, Agent, or Firm*—Ladas & Parry

(57) ABSTRACT

A spraying head for the humidification of the intake air of a piston engine, said spraying head comprising at least one nozzle (3) for supplying a liquid humidifying the intake air into the air intake duct or into a space leading to the air intake duct of the engine. The spraying head (1) is movable between at least two positions, a first position (FIG. 2a), in which first position the spraying head is retracted, and a second position (FIG. 2b), in which second position the spraying head is protruding.

12 Claims, 2 Drawing Sheets

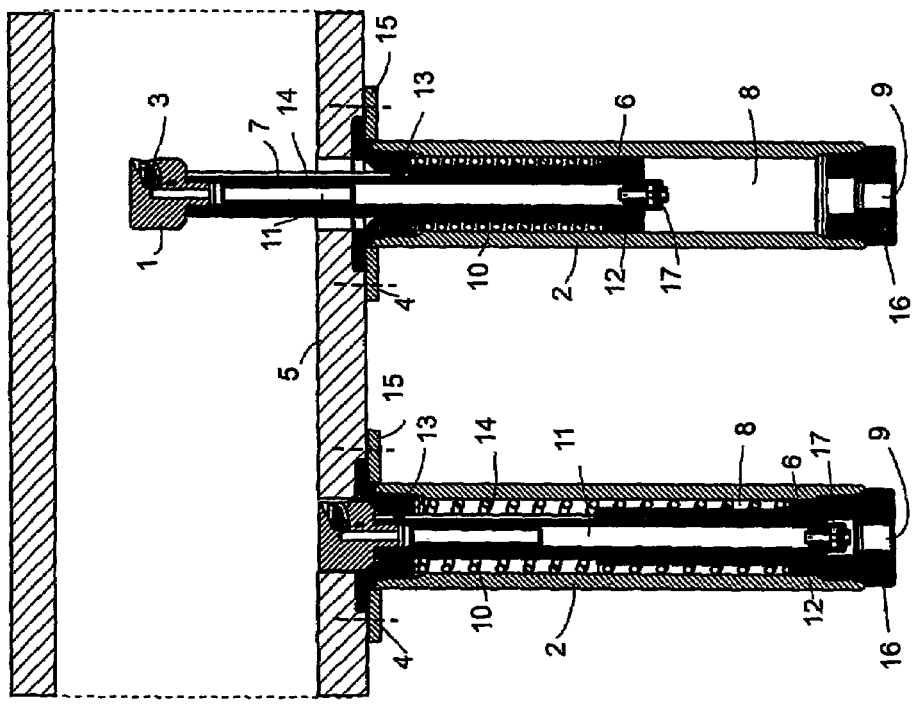
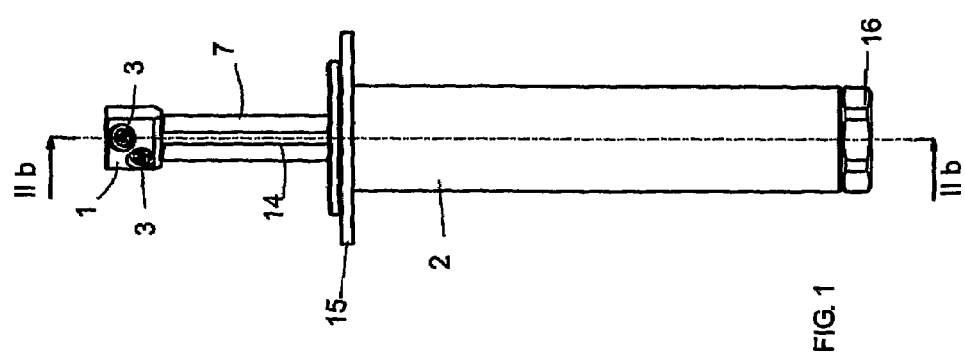

SPRAYING HEAD

BACKGROUND OF THE INVENTION

The present invention relates to a spraying head as defined in the preamble of claim 1 for humidifying intake air with an aqueous mist.

The exhaust gases of piston engines, in particular diesel engines, contain many kinds of noxious combustion products. At the high combustion temperatures, the combustion process in the cylinder of a piston engine produces nitrogen oxides (NOx), which are emitted together with the exhaust gases into the atmosphere. Because of the negative environmental effects of nitrogen oxide emissions, efforts are undertaken to minimize their production.

As is known, adding water to the combustion process reduces the generation of nitrogen oxides. This phenomenon is based on the cooling effect of water. In practice, the introduction of water into the combustion process in a piston engine is often implemented by injecting water into the intake air. These arrangements are advantageous in respect of the shaft efficiency of the engine. The maximum amount of water introduced into the combustion space of the engine may be that amount which will remain in gaseous form in the intake air pressure and temperature conditions.

It has been established that introducing water mist into the intake air is a very advantageous and effective method of reducing noxious emissions. The spraying heads disclosed by the invention are used especially in connection with the humidification of the intake air of engines. When the spraying head is mounted in its position of application in the air intake duct of the engine, e.g. in connection with a turbocharged diesel engine before and/or after the compressor of the turbocharger, before and/or after a possible intercooler, it is subjected to very demanding conditions. The intake air flow rate in the air intake duct is e.g. of the order of 80 m/s. The temperature may also be fairly high, e.g. above 100 degrees C. In addition, the nozzles used must not be an obstruction to the intake air flow when they are not in use. An additional impediment may be the clogging of the nozzles especially when the nozzle head is not in use.

The object of the invention is to achieve a completely new type of spraying head that allows the intake air to be humidified when necessary and that forms no impediment to the intake air flow when not in use.

The spraying head of the invention is characterized in that the spraying head 1 is movable between at least two positions, a first position, in which first position the spraying head is retracted, and a second position, in which second position the spraying head is protruding.

The spraying head of the invention is additionally characterized by what is stated in claims 2–11.

The solution of the invention has numerous significant advantages. By implementing the spraying head so that it pops up when activated and is retracted when in non-active state, a spraying head solution is achieved that forms no obstruction to intake air flow when not in use. In addition, the solution disclosed allows the nozzles to remain clean. Providing the spraying head holder with a guide element and the spraying head, preferably its shank, with a mating element for the guide surface makes it possible to maintain a desired directional orientation of the nozzles. By providing the nozzle head with several nozzles, very effective humidification of intake air is achieved. By using the liquid to be sprayed as a pressure medium, a very advantageous and efficient solution is achieved. By providing a spring element for returning the spraying head into the retracted position, a faster and more effective transition to the retracted position is achieved.

BRIEF DESCRIPTION OF THE DRAWINGS

In the following, the invention will be described in detail by the aid of an example with reference to the attached drawing, wherein FIG. 1 presents a spraying head according to the invention, FIG. 2a presents a sectional view of a spraying head according to the invention in a non-active position and mounted on an air intake duct, FIG. 2b presents a sectional view of a spraying head according to the invention in an active position and mounted on an air intake duct.

DETAILED DESCRIPTION OF THE INVENTION

Figure 4:
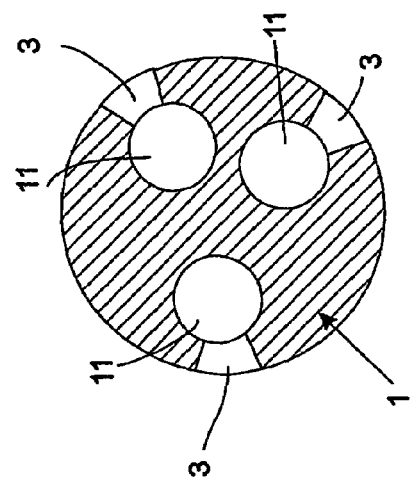
FIG. 4 presents a sectional view of a spraying head according to the invention.

FIGS. 1, 2a and 2b present an embodiment of the spraying head of the invention. A spraying head for humidifying the intake air of a piston engine, said spraying head 1 comprising at least one nozzle 3 for supplying a liquid humidifying the intake air into the air intake duct 5 or into a space leading to the air intake duct of the engine. The spraying head is movable between at least two positions, a first position, in which first position the spraying head is retracted, and a second position, in which second position the spraying head 1 is protruding. In the non-active state, in the first position (FIG. 2a, 3a), the spraying head is in a retracted position, whereas in the active state, in the second position (FIG. 2b, 3b), at least one nozzle 3 of the spraying head extends to a position inside the air intake duct relative to the level of the edges of the spraying head holder 2 or and/or the interior surface of the air intake duct 5.

The holder 2 is provided with at least one guide element 13, and the spraying head, preferably its shank part 7, with at least one mating surface 14 matching the guide element for keeping the spraying head in the desired orientation. The guide element 13 is e.g. a groove to which a ridge in the shank element, aligned in the direction of motion, is fitted. The guide element may also consist of e.g. rolling elements, such as balls or rollers, with a counter element 14 movably fitted between these.

The spraying head 1, preferably its shank part 7, and the holder 2 are arranged to function as a cylinder-piston combination in which the spraying head, preferably its shank part 7, is provided with a piston part 6 and the holder 2 comprises a cylinder chamber 8, the piston part being movably fitted in it. In the embodiment in FIG. 2a, pressure medium is supplied from the inlet 9 through a pipe element (not shown) into the cylinder chamber space below the piston 6 from the distant end 16 of the holder 2 relative to the air intake duct 5. By the action of the pressure medium, the piston moves upwards in the figure, thereby causing the spraying head 1 mounted on the shank part 7 to move to the second position shown in FIG. 2b. The pressure medium is thereby admitted from the chamber 8 via the channel 11 provided in the shank part 7 to the nozzle 3, from where it Is injected into the air intake duct. The channel 11 is typically provided with a throttle element 17. The piston part 6 is provided with a sealing element 12 or equivalent to provide a sliding fit between it and the interior surface of the cylinder chamber 8.

Arranged in connection with the spraying head are means for moving the spraying head 1 from the protruding position into the retracted position. Typically, the system comprises a spring element 10 arranged between the spraying head 1 and the holder 2 to move the spraying head from the protruding position to the retracted position. The spring element is preferably placed between the piston element 6 and the end piece of the holder part 2 adjoining the air intake duct 5. The spring is a helical spring, which is compressed when the spraying head moves into the protruding position. When the pressure of the pressure medium acting on the piston falls below the desired value, the spraying head is moved to the retracted position by the action of the spring force and/or a possible pressure acting in the air intake duct.

The spraying head is secured to the wall 5 of the air intake duct typically by a rigid joint, using e.g. fastening means 4, such as screws or bolts, at its flange 15. The wall 5 of the air intake duct is provided with an opening for the spraying head. In the embodiment in FIG. 2a, the spraying head, at least its nozzles 3, as seen in the direction of motion of the spraying head, remain outside the imaginary surface formed by the inner edges of the opening in the wall of the air intake duct, i.e. the edges on the interior side of the air intake duct. If the spraying head is of a substantially cylindrical form, then the nozzles typically open to the cylindrical surface. Similarly, if the spraying head has a conical form, then the nozzles open to the conical surface. Typically, the nozzles open to the lateral surface of the spraying head.

The spraying head comprises at least one first channel 11 for conveying a medium to at least one nozzle 3. The spraying head comprises at least one second channel 21 for conveying a second medium to at least one nozzle 3. The spraying head 1 comprises at least two nozzles 3. The spraying head 1 is used for spraying a liquid mist, especially water mist. The spraying head 1 is moved from the first position to the second position by the action of a pressure medium.

Figure 3:
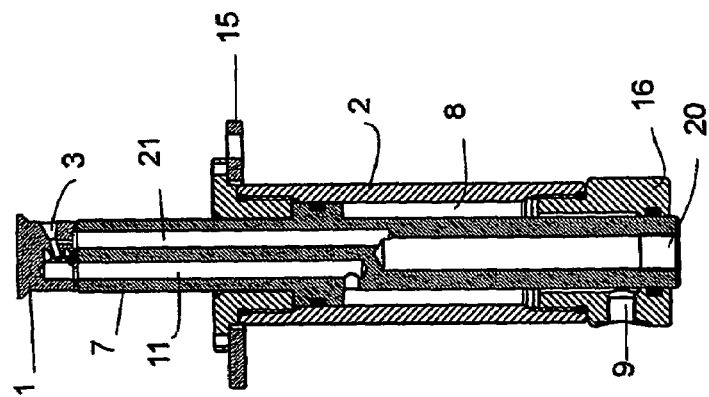
FIG. 3a presents a sectional view of a second spraying head according to the invention in a non-active position.
FIG. 3b presents a sectional view of a second spraying head according to the invention in an active position.
Figure 3:
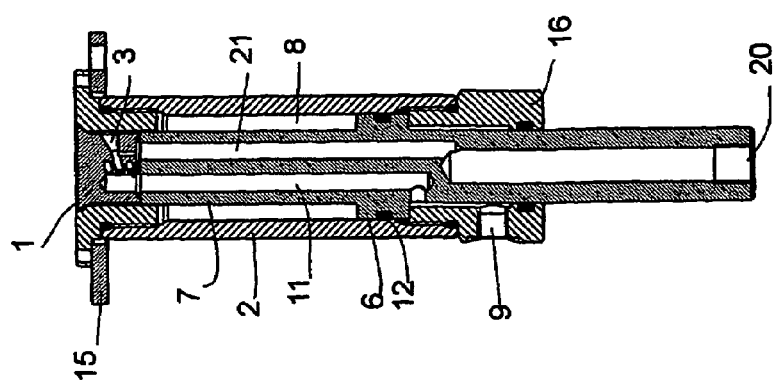

FIGS. 3a and 3b present another embodiment of the spraying head of the invention, wherein two mediums can be fed into the nozzle 3. A liquid, typically water, is supplied through the inlet aperture 9 into the chamber 8, from where it can flow through the first channel 11 to the nozzle 3. The pressure of the first pressure medium forces the spraying head 1 from the first position (FIG. 3a) to the second position (FIG. 3b). Provided in the shank 7 of the spraying head is a second channel 21, into which a second pressure medium, typically a gas, such as air, is supplied through the second inlet aperture 20. In the embodiment presented in FIGS. 3a and 3b the shank has been made long so that, in the non-active first position, it extends outwards, in the figure downwards from the end opposite to the spraying head 1, while in the active position it extends roughly to the level of the holder end 16. In the solution according to this embodiment, the nozzle head is moved from the active second position to the first position by the action of the pressure in the air intake duct, said pressure exerting a force on the spraying head 1 end facing towards the air intake duct.

FIG. 4 presents a spraying head 1 according to the invention, sectioned at a plane perpendicular to the longitudinal axis of the spraying head. The spraying head comprises several nozzles 3, to which a pressure medium is supplied via several channels 11. The spraying head works e.g. as follows. First, the spraying head moves into the active position and spraying is started with one of the first nozzles 3. Next, the spraying can be continued by spraying through two nozzles, and finally through all three nozzles.

The spraying head of the invention is very well applicable for the spraying of a high-pressure medium. The pressure in the piping is typically over 30 bar, preferably over 50 bar, most preferably over 75 bar. The nozzles of the spraying head are preferably disposed on a lateral surface of the spraying head, being thus protected against possible soiling in the non-active state. The pressure of the liquid injected through the spraying head may be typically between 10–300 bar. The liquid, especially aqueous liquid injected into the air intake ductwork is a fine mist. 50% of the water volume (Dv50) is in the form of droplets typically having a droplet size below 200 micrometers, preferably below 100 micrometers and more preferably below 50 micrometers. The form of the spraying head, the number of nozzles and their orientation may vary depending on the application. It is also possible to supply different mediums to the nozzle, such as water and gas. The figure does not show the nozzles in detail, but they may be replaceable depending on the application. The nozzles are therefore of a type such that they produce a spray of fine mist when supplied with liquid under a high pressure. Many kinds of nozzles of this category are known, e.g. from fire extinguishing technology employing water mist. For example, specifications WO 92/20454 and WO 94/06567 disclose nozzles that produce a water mist at a high pressure. Naturally, other types of nozzles may also be used, e.g. specification WO 01/45799 discloses yet another nozzle.

It is obvious to the person skilled in the art that the invention is not limited to the embodiments described above, but that it may be varied within the scope of the claims presented below.

The invention claimed is:

1. Spraying head for the humidification of the intake air of a piston engine, said spraying head comprising at least one nozzle (3) for supplying a liquid humidifying the intake air into the air intake duct or into a space leading to the air intake duct of the engine, characterized in that the spraying head (1) is movable between at least two positions, a first position, in which first position the spraying head is retracted, and a second position, in which second position the spraying head is protruding.

2. Spraying head according to claim 1, characterized in that, in a non-active state, the spraying head is in the retracted first position, while in an active state, in the second position, at least one of the nozzles (3) of the spraying head extends to a position inside the air intake duct relative to the level of the edges of the spraying head holder (2) or and/or the interior surface of the air intake duct (5).

3. Spraying head according to claim 1, characterized in that the holder (2) is provided with at least one guide element (13) and the spraying head with at least one guide element mating surface (14) for keeping the spraying head in a desired orientation.

4. Spraying head according to claim 1, characterized in that the spraying head (1), preferably its shank part (7), and the holder (2) are arranged to function as a cylinder-piston combination in which the spraying head, preferably its shank part (7), is provided with a piston part (7) and the holder (2) comprises a cylinder chamber (8), the piston part being movably fitted in it.

5. Spraying head according to claim 1 characterized in that the spraying head arrangement comprises means for moving the spraying head (1) from the protruding position into the retracted position.

6. Spraying head according to claim 1, characterized in that a spring element (10) is arranged between the spraying head (1) and the holder (2) for 8 moving the spraying head from the protruding position to the retracted position.

7. Spraying head according to claim 1, characterized in that the spraying head comprises at least one first channel (11) for conveying a pressure medium to at least one nozzle (3).

8. Spraying head according to claim 1, characterized in that the spraying head comprises at least one second channel (21) for conveying a second pressure medium to at least one nozzle.

9. Spraying head according to claim 1, characterized in that the spraying head (1) comprises at least two nozzles (3).

10. Spraying head according to claim 1, characterized in that the spraying head (1) comprises at least one second channel for conveying a medium to another nozzle.

11. Spraying head according to claim 1, characterized in that the spraying head sprays a liquid mist, especially water mist.

12. Spraying head according to claim 1, characterized in that the spraying head (1) is moved from the first position to the second position by the action of a pressure medium.

* * * * *